United States Patent
Bi et al.

(10) Patent No.: US 9,088,616 B2
(45) Date of Patent: Jul. 21, 2015

(54) METHOD AND APPARATUS FOR AUTHENTICATION

(75) Inventors: Xiaoyu Bi, Shenzhen (CN); Aiqin Zhang, Shenzhen (CN); Dongmei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 591 days.

(21) Appl. No.: 12/886,949

(22) Filed: Sep. 21, 2010

(65) Prior Publication Data

US 2011/0072488 A1 Mar. 24, 2011

(30) Foreign Application Priority Data

Sep. 21, 2009 (CN) .......................... 2009 1 0093828

(51) Int. Cl.
| | | |
|---|---|---|
| *G06F 15/16* | (2006.01) | |
| *G06F 15/173* | (2006.01) | |
| *G06F 17/00* | (2006.01) | |
| *G06F 7/04* | (2006.01) | |
| *H04M 1/24* | (2006.01) | |

(Continued)

(52) U.S. Cl.
CPC .............. *H04L 63/20* (2013.01); *H04L 63/108* (2013.01); *H04W 12/06* (2013.01); *H04L 9/0844* (2013.01); *H04L 2209/80* (2013.01); *H04W 4/22* (2013.01); *H04W 12/00* (2013.01); *H04W 12/04* (2013.01); *H04W 36/0038* (2013.01); *H04W 48/02* (2013.01); *H04W 48/08* (2013.01); *H04W 76/007* (2013.01); *H04W 76/045* (2013.01); *H04W 80/02* (2013.01)

(58) Field of Classification Search
CPC ..... H04W 48/02; H04W 48/08; H04W 12/04; H04W 12/06; H04W 36/0038; H04W 12/00; H04L 2209/80; H04L 9/0844

USPC .......... 726/1, 2, 4, 21; 709/227, 238; 379/33, 379/37, 45

See application file for complete search history.

(56) References Cited

U.S. PATENT DOCUMENTS 6,125,283 A * 9/2000 Kolev et al. ................. 455/552.1
7,587,598 B2 * 9/2009 Ohba et al. .................... 713/169

(Continued)

FOREIGN PATENT DOCUMENTS

| CN | 101056171 A | 10/2007 |
|---|---|---|
| CN | 101119381 | 2/2008 |

(Continued)

OTHER PUBLICATIONS

3GPP, List of S3 Docs—3GPP SA 3—3GPPSA3-Ad-Hoc, 3GPP, 2009, p. 1-2, http://www.3gpp.org/ftp/tsg_sa/wg3_security/adhocs/TSGS3_ADHOC_Sep09_Sophia/Docs/.*

(Continued)

*Primary Examiner* — Taylor Elfervig
(74) *Attorney, Agent, or Firm* — Slater & Matsil, L.L.P.

(57) ABSTRACT

A method and an apparatus for authentication are disclosed. The method includes: deciding to release a connection or continue a current service according to native information and network policy after an AKA authentication procedure fails. When the EPS AKA authentication procedure fails, the connection is not released immediately in the present invention, but the connection is released or the current service is continued according to the native information and network policy, thus avoiding unnecessary release of connections and saving resources.

20 Claims, 9 Drawing Sheets

(51) Int. Cl.
| | | |
|---|---|---|
| *H04M 11/04* | (2006.01) | |
| *H04L 29/06* | (2006.01) | |
| *H04W 12/06* | (2009.01) | |
| *H04W 12/00* | (2009.01) | |
| *H04W 48/08* | (2009.01) | |
| *H04W 48/02* | (2009.01) | |
| *H04L 9/08* | (2006.01) | |
| *H04W 36/00* | (2009.01) | |
| *H04W 12/04* | (2009.01) | |
| *H04W 4/22* | (2009.01) | |
| *H04W 76/00* | (2009.01) | |
| *H04W 76/04* | (2009.01) | |
| *H04W 80/02* | (2009.01) | |

(56) References Cited

U.S. PATENT DOCUMENTS

| | | | |
|---|---|---|---|
| 8,179,903 B2 * | 5/2012 | Gupta et al. | 370/400 |
| 2005/0149440 A1 | 7/2005 | Michelassi et al. | |
| 2005/0177723 A1 | 8/2005 | Huang et al. | |
| 2005/0265349 A1 | 12/2005 | Garg et al. | |
| 2005/0278776 A1 | 12/2005 | Kitagawa et al. | |
| 2006/0185003 A1 | 8/2006 | Laitinen et al. | |
| 2009/0103728 A1 | 4/2009 | Patel | |
| 2010/0011220 A1 | 1/2010 | Zhao et al. | |
| 2010/0266107 A1 * | 10/2010 | Brusilovsky et al. | 379/46 |
| 2012/0307803 A1 | 12/2012 | Yang et al. | |

FOREIGN PATENT DOCUMENTS

| | | |
|---|---|---|
| CN | 101156486 A | 4/2008 |
| CN | 101232736 A | 7/2008 |
| CN | 101237334 A | 8/2008 |
| CN | 101272251 A | 9/2008 |
| CN | 101400059 A | 4/2009 |
| CN | 101470794 A | 7/2009 |
| WO | WO 2009/012281 A2 | 1/2009 |

OTHER PUBLICATIONS

Ericsson, "Authentication failure during emergency call", (S3-091660), Sep. 2009, 3GPP TSG WG3 Security AdHoc S3, p. 1-5, http://portal.etsi.org/Portal_LastMeetingOutput/Form1.asp-?PersonId=0&TbId=386&TabId=&SubTB=386&sItDocType=0&SupCrit=3GPPSA3-Ad-Hoc+S3-091631&Param=&Alone=1.*

Al-Saraireh, J.; Yousef, S., "Analyses Authentication and Key Agreement (AKA Protocol for UMTS Mobile Networks," Mobile Computing and Wireless Communication International Conference, 2006. MCWC 2006. Proceedings of the First, vol., No., pp. 27,31, Sep. 17-20, 2006.*

Shalmany, N.A.; Rahbar, A.G.P., "Improved Adaptive Protocol for authentication and key agreement," Telecommunications, 2008. IST 2008. International Symposium on, vol., No., pp. 1,6, Aug. 27-28, 2008.*

Li Wang; Mei Song; Junde Song, "A Dynamic Periodic Distributing Scheme for Authentication Data Based on EAP-AKA in Heterogeneous Interworking Networks," Vehicular Technology Conference Fall (VTC 2009-Fall), 2009 IEEE 70th, vol., No., pp. 1,5, Sep. 20-23, 2009.*

3GPP TS 33.401 V9.4.0 $3^{rd}$ Generation Partnership Project; Technical Specification Group Services and System Aspects; 3GPP System Architecture Evolution (SAE); Security architecture (Release 9), Jun. 2010, (104 pages).

3GPP TS 24.301 V8.2.1 (Jun. 2009); *Technical Specification*; $3^{rd}$ Generation Partnership Project; Technical Specification Group Core Network and Terminals; Non-Access-Stratum (NAS) protocol for Evolved Packet System (EPS); Stage 3 (Release 8) (252 pgs.).

3GPP TSG CT WG1 Meeting 354; (C1-082168); Zagreb, Croatia, Jun. 23-27, 2008; Source: Ericsson; Title: Pseudo-CR or NAS Sequence No. Handling; Spec: 3GPP TS 24.301; Agenda item: 9.2.2; Document for: Discussion and Decision (6 pgs.).

Draft 3GPP TS 33.401 V9.1.0 (Jul. 2009); *Technical Specification*; $3^{rd}$ Generation Partnership Project; Technical Specification Group Services and Systems Aspects; 3GPP System Architecture Evolution (SAE); Security architecture; (Release 9) (100 pgs.).

European Patent Office Communication related to Application No. 10816719.8-2413, regarding the extended European search report, pursuant to Rule 62 EPC, the supplementary European search report (Art. 153(7) EPC) and the European search opinion; dated (mailed) May 7, 2012; Huawei Tech Co., Ltd. (6 pgs).

Written Opinion of the International Searching Authority issued in related Application No. PCT/CN2010/077085; dated (mailed) Dec. 23, 2010 for Huawei Tech Co., Ltd. et al.

International Search Report issued in related Application No. PCT/CN2010/077085; dated (mailed) Dec. 23, 2010 for Huawei Tech Co., Ltd. et al.

First Chinese Office Action of Chinese Application No. 201210028296.9, mailed Feb. 7, 2013, 8 pages. (Partial Translation).

Chinese Search Report received in Application No. 201210028296.9 mailed Jan. 29, 2013, 2 pages.

Communication Pursuant to Article 94(3) EPC received in Application No. 10 816 719.8-1856, mailed Mar. 6, 2013, 4 pages.

First Chinese Office Action of Chinese Application No. 200910093828.5 mailed Jan. 16, 2013, 6 pages. (Partial Translation).

Nokia Corporation, "AKA when NAS COUNT about to wrap around," 3GPP TSG-SA WG3 Meeting #54, S3-090100, Florence, Italy, Jan. 2009, 2 pages.

Chinese Search Report received in Application No. 200910093828.5 mailed Jan. 8, 2013, 2 pages.

$3^{rd}$ Generation Partnership Project; Technical Specification Group Services and System Aspects; 3GPP System Architecture Evolution (SAE); Security architecture; (Release 9), 3GPP TS 33.401 V9.0.0, Jun. 2009, 99 pages.

Gemalto, "Storage of EPS AKA security context in the UE," 3GPP TSG-SA WG3 Meeting #52bis, S3-081016, Sophia Antipolis, France, Sep. 23-26, 2008, 5 pages.

Nokia, et al., "AKA when NAS COUNT about to wrap around," 3GPP TSG-SA WG3 Meeting #54, S3-090256, Florence, Italy, Jan. 2009, 2 pages.

Search Report of Chinese Application No. 201210028296.9 mailed Dec. 18, 2012, 10 pages.

3GPP TS 23.401 v8.4.1 $3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 8), Dec. 2008, 219 pages.

* cited by examiner

METHOD AND APPARATUS FOR AUTHENTICATION

CROSS-REFERENCE TO RELATED APPLICATION

This application claims priority to Chinese Patent Application No. 200910093828.5, filed on Sep. 21, 2009, which is hereby incorporated by reference in its entirety.

FIELD OF THE INVENTION

The present invention relates to communication technologies, and in particular, to a method and an apparatus for authentication.

BACKGROUND OF THE INVENTION

The Non-Access Stratum (NAS) count is part of a security context in a Long Term Evolution (LTE) system. In the LTE system, the NAS count may serve as a lifetime of a key to make the key fresh; and the NAS count ensures synchronization of the key between a User Equipment (UE) and a network, and resists replay attacks. Each Evolved Packet System (EPS) security context includes two independent NAS count values: an uplink NAS count value, and a downlink NAS count value. The counters of the two NAS count values are maintained independently by the UE and a Mobility Management Entity (MME) respectively.

The length of the NAS count is 32 digits, and is composed of two parts: NAS sequence number (SQN), and NAS overflow value. The NAS SQN is made up of 8 digits, and the NAS overflow value is made up of 16 digits. The NAS SQN is carried in every NAS message. When a new or retransmitted NAS message under security protection is sent, the sender adds 1 to the NAS SQN value; when the NAS SQN comes to the maximum value and one cycle is complete, the NAS overflow value increases by 1.

In the prior art, when the MME detects that the downlink NAS count value is about to wrap around, namely, when the NAS count value closes to the maximum value $2^{24}$, the MME triggers a new EPS Authentication and Key Agreement (AKA) authentication procedure to set up a new security context. When the security context is activated, the NAS count value is initialized to 0. When the MME detects that the uplink NAS count value of the UE also closes to the maximum value, namely, when it is about to wrap around, the MME triggers an EPS AKA authentication procedure.

In the prior art, the MME triggers the EPS AKA authentication procedure hardly when detecting that the NAS count value is about to wrap around, and releases the connection once the EPS AKA authentication procedure fails. Such security processing leads to a waste of resources.

SUMMARY OF THE INVENTION

Embodiments of the present invention provide a method and an apparatus for authentication to save resources.

An authentication method in an embodiment of the present invention includes:

determining, by a wireless communication network entity, whether a current service is allowed as an unauthenticated service according to a network policy if an Authentication and Key Agreement (AKA) authentication procedure for the current service fails;

keeping a connection of the current service, by the wireless communication network entity, if the current service is allowed as an unauthenticated service according to the network policy, and the current service does not require authentication; or keeping the connection of the current service, by the wireless communication network entity, if the current service is allowed as an unauthenticated service according to the network policy, and a User Equipment (UE) is incapable of performing the AKA authentication procedure; or keeping the connection of the current service, by the wireless communication network entity, if the current service is allowed as an unauthenticated service according to the network policy, and no Subscriber Identity Module (SIM)/Universal Subscriber Identity Module (USIM) is inserted in the UE.

An apparatus in an embodiment of the present invention includes:

an executing module, configured to execute an Authentication and Key Agreement (AKA) authentication procedure to a user equipment (UE); and a processor, comprising:

a first judging unit, configured to determine whether a current service is allowed as an unauthenticated service according to a network policy if the AKA authentication procedure for the current service fails;

a second judging unit, configured to determine whether the current service requires authentication, or whether the UE is capable of performing the AKA authentication procedure, or whether a SIM/USIM is inserted in the UE if the first judging unit determines the current service is allowed as an unauthenticated service according to the network policy;

an executing unit, configured to keeping a connection of the current service if the second judging unit determines the current service does not require authentication, or the UE is incapable of performing the AKA authentication procedure, or no SIM/USIM is inserted in the UE.

In the technical solution under the present invention, when the EPS AKA authentication procedure fails, the connection is not released immediately, but the connection is released or the current service is continued according to the native information and the network policy, thus avoiding unnecessary release of connections and saving resources.

DETAILED DESCRIPTION OF THE EMBODIMENTS

The technical solution under the present invention is described below with reference to accompanying drawings and preferred embodiments.

Figure 1:
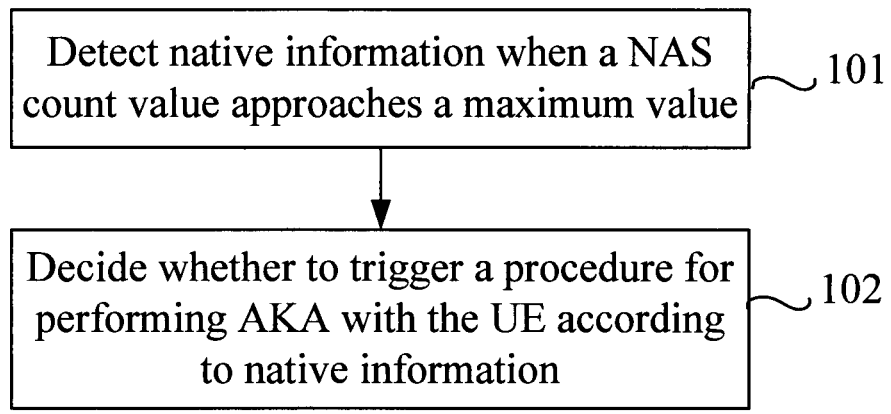
FIG. 1 is a flowchart of an authentication method in a first embodiment of the present invention.

FIG. 1 is a flowchart of an authentication method in the first embodiment of the present invention. As shown in FIG. 1, the method in this embodiment includes the following steps:

Step 101: Detect native information when a NAS count value closes to a maximum value.

Step 102: Decide whether to trigger a procedure for performing AKA with the UE according to native information.

When the NAS count value closes to the maximum value, the NAS count value is about to wrap around. The AKA authentication procedure may be an EPS AKA authentication procedure.

The entity that performs the foregoing two steps may be an MME. When the downlink or uplink NAS count value is about to wrap around, the MME detects the native information, and decides whether to trigger the EPS AKA authentication procedure according to the detection result.

Taking the detection of the uplink NAS count value as an example, the MME receives a NAS message, and the NAS count value increases by 1. The MME detects whether the NAS count value closes to the maximum value in this way: The MME checks whether the NAS count value is equal to a preset threshold value which is close to the maximum value; if so, the MME detects the native information, and decides whether to trigger an AKA authentication procedure according to the detection result; if not, the MME continues to receive the NAS message.

In this embodiment, the MME does not trigger the EPS AKA authentication procedure as soon as detecting that the NAS count value is about to wrap around, thus reducing the times for triggering the EPS AKA authentication procedures, avoiding the resource waste caused by unnecessary EPS AKA authentication procedures, and saving resources.

The following describes the relevant technologies before the second embodiment.

In the LTE system, the EPS security contexts are categorized in two modes. From the perspective of the use status, the EPS security contexts are categorized into current EPS security context and non-current EPS security context. The current EPS security context refers to the last activated security context, namely, the security context currently in use. The current EPS security context and a non-current native EPS security context may coexist. According to the generation mode, EPS security contexts may be categorized into mapped EPS security context and native EPS security context. The mapped EPS security context refers to a security context mapped from another system, for example, mapped from a Universal Mobile Telecommunications System (UMTS) to an LTE system. The native EPS security context refers to a security context generated in an LTE system through EPS AKA. The native EPS security contexts are categorized into partial native EPS security context and full native EPS security context. The main difference between them is: A partial native EPS security context does not pass through a successful NAS security mode procedure. Therefore, a partial native EPS security context includes a root key $K_{ASME}$ for authentication of the UE accessing an LTE network, a Key Set Identifier (KSI), security capabilities of the UE, and a NAS count value set to 0 only. A full native EPS security context passes through an EPS AKA authentication procedure and is activated by a successful NAS Security Mode Command (SMC) procedure, and includes a set of full EPS NAS security contexts. Therefore, the full native EPS security context includes an Integrity Key (IK) ($K_{NASint}$) and a Cipher Key (CK) ($K_{NASenc}$) of the NAS, a selected NAS encryption algorithm, and an integrity algorithm identifier additionally.

Figure 2:
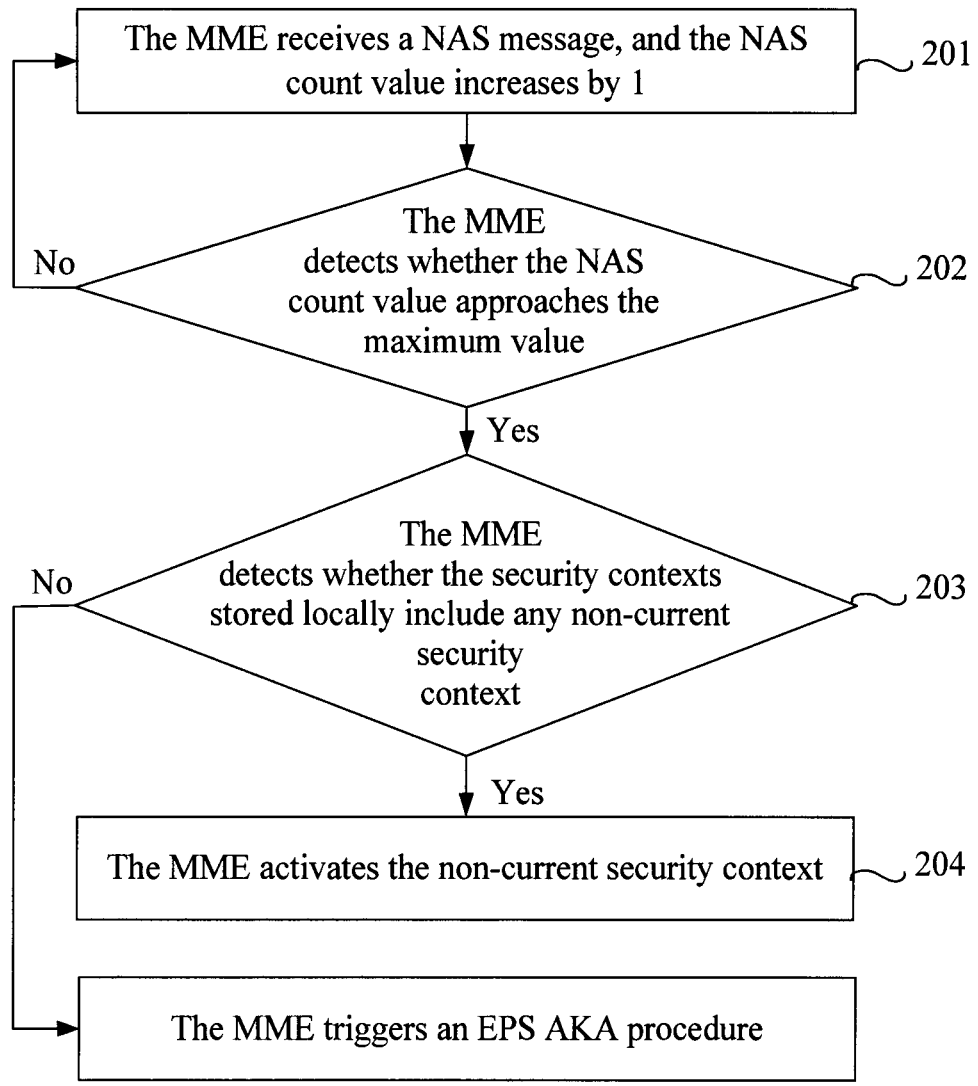
FIG. 2 is a flowchart of an authentication method in a second embodiment of the present invention.

FIG. 2 is a flowchart of an authentication method in the second embodiment of the present invention. The native information in this embodiment is the security context stored locally. The security contexts mentioned below refer to native EPS security contexts.

As shown in FIG. 2, the method in this embodiment includes the following steps:

Step 201: The MME receives a NAS message, and the NAS count value increases by 1.

Step 202: The MME checks whether the NAS count value closes to the maximum value. If so, step 203 occurs; if not, step 201 occurs.

Specifically, a value close to the maximum value may be preset as a threshold value. The MME checks whether the NAS count value is equal to the maximum value. If so, step 203 occurs; if not, step 201 occurs.

Step 203: The MME checks whether the native security contexts include any non-current security context in addition to current security contexts. If so, step 204 occurs; if not, the MME triggers an EPS AKA authentication procedure.

Step 204: The MME activates the non-current security context.

The MME may activate the non-current security context by running a NAS SMC procedure successfully. A successful NAS SMC procedure includes: The MME uses the security context to perform integrity protection for the NAS SMC message. When the UE verifies the integrity of the NAS SMC message successfully, the UE sends a NAS Security Mode Complete message to the MME. The MME decrypts the NAS Security Mode Complete message, and performs integrity verification. Therefore, the MME knows that this security context is shared with the UE and is activated. In this step, the MME activates the non-current security context by executing the NAS SMC procedure successfully.

However, if the NAS SMC procedure fails, the MME triggers an EPS AKA authentication procedure.

The non-current native security context may be a non-current partial native security context or a non-current full native security context, and step 204 may be: The MME activates the non-current partial native security context or the non-current full native security context.

In this embodiment, through a successful NAS SMC procedure triggered by the MME, the non-current native security context shared by the MME and the UE is activated. If the MME receives no NAS Security Mode Complete message from the UE, the MME triggers an EPS AKA authentication procedure.

The application scenario of this embodiment is described below through two examples.

(1) When the MME detects that the NAS count value closes to the maximum value, the MME detects the security context to know that a non-current partial security context is stored in the MME and the UMTS Subscriber Identity Module Integrated Circuit Card (UICC). The MME activates the non-current partial security context. In this case, the NAS count value is initialized to 0, and the EPS AKA authentication procedure is avoided.

In this scenario, the MME does not trigger the EPS AKA authentication procedure immediately, thus avoiding a waste of the non-current partial security context resources, and avoiding the resource waste caused by implementation of unnecessary EPS AKA authentication procedures.

(2) The UE creates the current security context in the process of accessing the EPS. Afterward, when the UE hands over from an Evolved Universal Terrestrial Radio Access Network (E-UTRAN) to a Universal Terrestrial Radio Access Network (UTRAN) or GSM/EDGE Radio Access Network (GERAN), the UE stores the local security context generated in the E-UTRAN. Afterward, when the UE hands over back to the E-UTRAN, the mapped security context is applied. The mapped security context becomes the current security context. The security context previously stored by the UE and the MME and generated in the E-UTRAN becomes a non-current full security context. In this scenario, when the MME detects that the NAS count value closes to the maximum value, the MME detects the security context to know that this non-current full security context is stored locally. Therefore, the MME activates the non-current full security context, thus avoiding the EPS AKA authentication procedure.

In this scenario, the MME does not trigger the EPS AKA authentication procedure immediately, thus avoiding a waste of the previously stored non-current full security context resources, and avoiding the resource waste caused by implementation of unnecessary EPS AKA authentication procedures.

In this embodiment, the MME does not trigger the EPS AKA authentication procedure as soon as detecting that the NAS count value is about to wrap around, thus reducing the times for triggering the EPS AKA authentication procedures, avoiding the resource waste caused by unnecessary EPS AKA authentication procedures, and saving resources.

Figure 3:
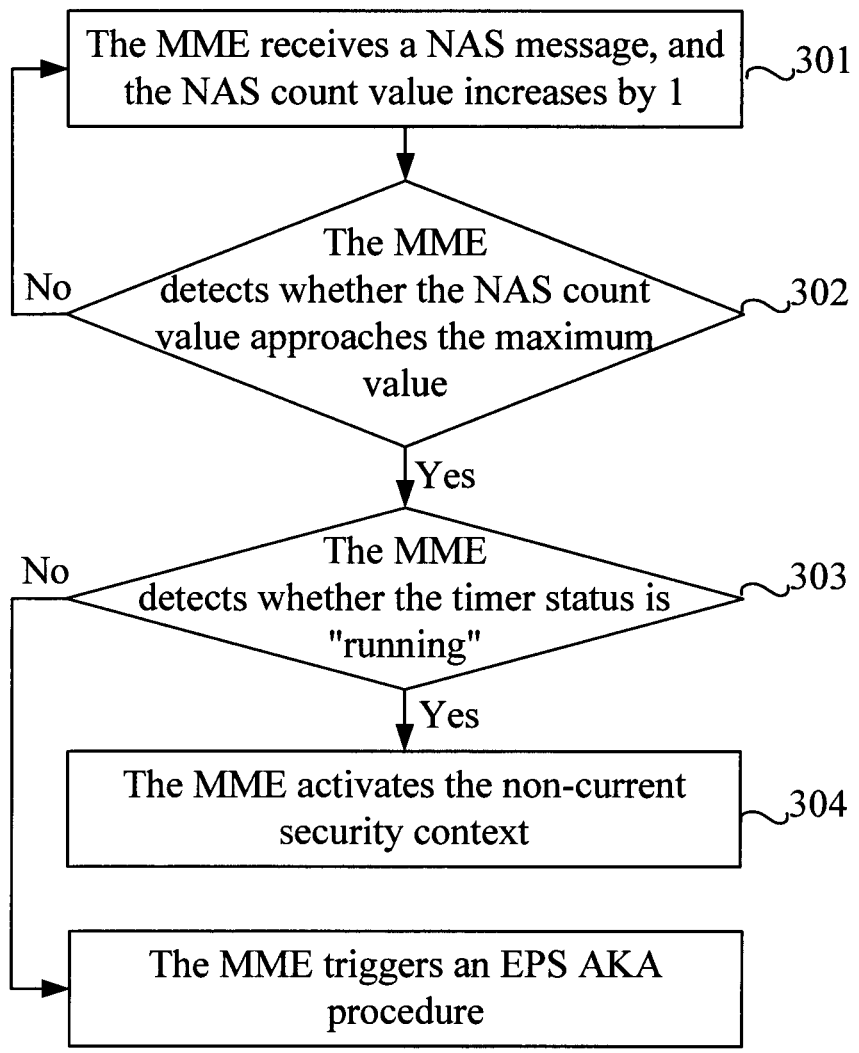
FIG. 3 is a flowchart of an authentication method in a third embodiment of the present invention.

FIG. 3 is a flowchart of an authentication method in the third embodiment of the present invention. In this embodiment, the native information is timer status. In this embodiment, a timer is preset on the MME. The status of the timer is "running" or "stop". When the NAS count value reaches the threshold value and the EPS AKA authentication procedure is completed successfully, the status of the timer changes to "running"; when the timing duration of the timer meets the set time threshold value, the status of the timer changes to "stop".

As shown in FIG. 3, the method in this embodiment includes the following steps:

Step 301: The MME receives a NAS message, and the NAS count value increases by 1.

Step 302: The MME checks whether the NAS count value closes to the maximum value. If so, step 303 occurs; if not, step 301 occurs.

Specifically, a value close to the maximum value is preset as a threshold value (such as $2^{24}-100$). The MME checks whether the NAS count value is equal to $2^{24}-100$. If so, step 303 occurs; if not, step 301 occurs.

Step 303: The MME checks whether the timer is running. If so, step 304 occurs; if not, the MME triggers an EPS AKA authentication procedure.

Step 304: The MME activates the non-current security context.

The non-current security context is activated by a successful NAS SMC procedure. A successful NAS SMC procedure includes: The MME uses the security context to perform integrity protection for the NAS SMC message. When the UE verifies the integrity of the NAS SMC message successfully, the UE sends a NAS Security Mode Complete message to the MME. The MME decrypts the NAS Security Mode Complete message, and performs integrity verification. Therefore, the MME knows that this security context is shared with the UE and is activated. In step 304, the MME activates the non-current native security context by executing the NAS SMC procedure successfully.

However, if the NAS SMC procedure fails, the MME triggers an EPS AKA authentication procedure.

In practice, the downlink NAS count value is generally close to the uplink NAS count value. When the MME detects that the downlink NAS count value is about to wrap around, the wrap around of the uplink NAS count value will be detected soon. Moreover, the MME triggers the NAS SMC procedure in a period after triggering the EPS AKA authentication procedure. The NAS count value is initialized to 0 through execution of the NAS SMC procedure. If the MME triggers the EPS AKA authentication procedure hardly when detecting that the downlink NAS count value is about to wrap around, but does not trigger the NAS SMC procedure to activate the newly generated security context before detecting that the uplink NAS count value is about to wrap around, the NAS count value is not initialized, and the prior art triggers the EPS AKA authentication procedure again after detecting that the uplink NAS count value is about to wrap around. In this embodiment, the timer status is detected to check whether the period starting from completion of the previous successful EPS AKA authentication procedure meets the set time threshold value. This time threshold value is determined according to the duration from completion of the successful EPS AKA authentication procedure to triggering of the NAS SMC procedure. If this NAS count value closes to the maximum value, and the period starting from completion of the previous successful EPS AKA authentication procedure is less than the set time threshold value, the MME triggers the NAS SMC procedure. If this NAS count value closes to the maximum value, and the period starting from completion of the previous successful EPS AKA authentication procedure is greater than or equal to the set time threshold value, the MME triggers the EPS AKA authentication procedure. Therefore, as regards the foregoing actual application scenario, this embodiment avoids second triggering of the EPS AKA authentication procedure because no NAS SMC procedure is triggered before detecting that the uplink NAS count value is about to wrap around, thus reducing the EPS AKA authentication procedures implemented, avoiding the resource waste caused by triggering of unnecessary EPS AKA authentication procedures, and saving resources.

Figure 4:
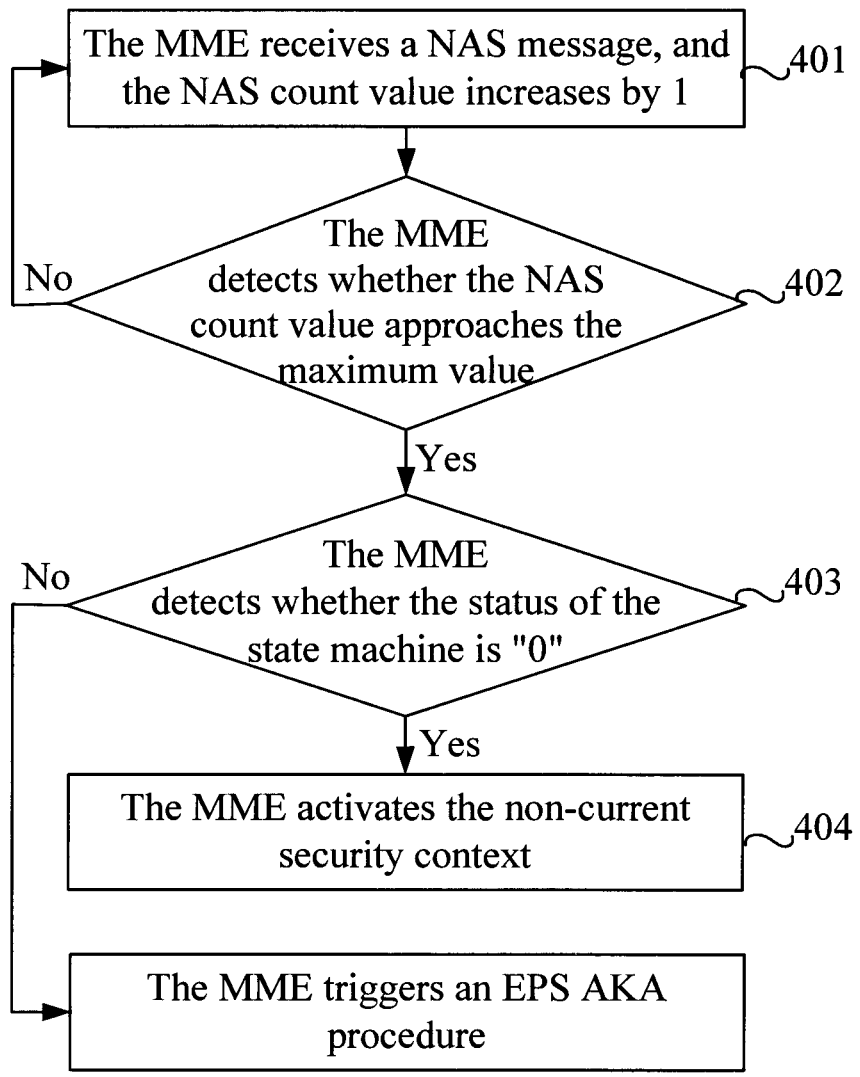
FIG. 4 is a flowchart of an authentication method in a fourth embodiment of the present invention.

FIG. 4 is a flowchart of an authentication method in the fourth embodiment of the present invention. In this embodiment, the native information is the status of a state machine. In this embodiment, a state machine is preset on the MME. The status of the state machine is "running" or "idle". Specifically, "0" represents "running", and "1" represents "idle". "Running" indicates that the period starting from completion of the previous successful EPS AKA authentication procedure is less than the set time threshold value; and "idle" indicates that the period starting from completion of the previous successful EPS AKA authentication procedure is greater than or equal to the set time threshold value. The state machine may be triggered by the timer.

As shown in FIG. 4, the method in this embodiment includes the following steps:

Step 401: The MME receives a NAS message, and the NAS count value increases by 1.

Step 402: The MME checks whether the NAS count value closes to the maximum value. If so, step 403 occurs; if not, step 401 occurs.

Specifically, a value close to the maximum value is preset as a threshold value (such as $2^{24}-100$). The MME checks whether the NAS count value is equal to $2^{24}-100$. If so, step 403 occurs; if not, the MME triggers the EPS AKA authentication procedure.

Step 403: The MME checks whether the status of the state machine is "0". If so, step 404 occurs; if not, the MME triggers an EPS AKA authentication procedure.

Step 404: The MME activates the non-current security context.

The non-current security context is activated by a successful NAS SMC procedure. A successful NAS SMC procedure includes: The MME uses the security context to perform integrity protection for the NAS SMC message. When the UE verifies the integrity of the NAS SMC message successfully, the UE sends a NAS Security Mode Complete message to the MME. The MME decrypts the NAS Security Mode Complete message, and performs integrity verification. Therefore, the MME knows that this security context is shared with the UE and is activated. In step 404, the MME activates the non-current native security context by executing the NAS SMC procedure successfully.

However, if the NAS SMC procedure fails, the MME triggers an EPS AKA authentication procedure.

In practice, the downlink NAS count value is generally close to the uplink NAS count value. When the MME detects that the downlink NAS count value is about to wrap around, the wrap around of the uplink NAS count value will be detected soon. Moreover, the MME triggers the NAS SMC procedure in a period after triggering the EPS AKA authentication procedure. The NAS count value is initialized to 0 through execution of the NAS SMC procedure. If the MME triggers the EPS AKA authentication procedure hardly when detecting that the downlink NAS count value is about to wrap around, but does not trigger the NAS SMC procedure before detecting that the uplink NAS count value is about to wrap around, the NAS count value is not initialized, and the prior art triggers the EPS AKA authentication procedure again after detecting that the uplink NAS count value is about to wrap around. In this embodiment, the status of the state machine is detected to check whether the period starting from completion of the previous successful EPS AKA authentication procedure meets the set time threshold value. This time threshold value is determined according to the duration from completion of the successful EPS AKA authentication procedure to triggering of the NAS SMC procedure. If this NAS count value closes to the maximum value, and the period starting from completion of previous successful EPS AKA authentication procedure is less than the set time threshold value, the MME triggers the NAS SMC procedure. If this NAS count value closes to the maximum value, and the period starting from completion of the previous successful EPS AKA authentication procedure is greater than or equal to the set time threshold value, the MME triggers the NAS AKA authentication procedure. Therefore, as regards the foregoing actual application scenario, this embodiment avoids second triggering of the EPS AKA authentication procedure because no NAS SMC procedure is triggered before detecting that the uplink NAS count value is about to wrap around, thus reducing the EPS AKA authentication procedures implemented, avoiding the resource waste caused by triggering of unnecessary EPS AKA authentication procedures, and saving resources.

Figure 5:
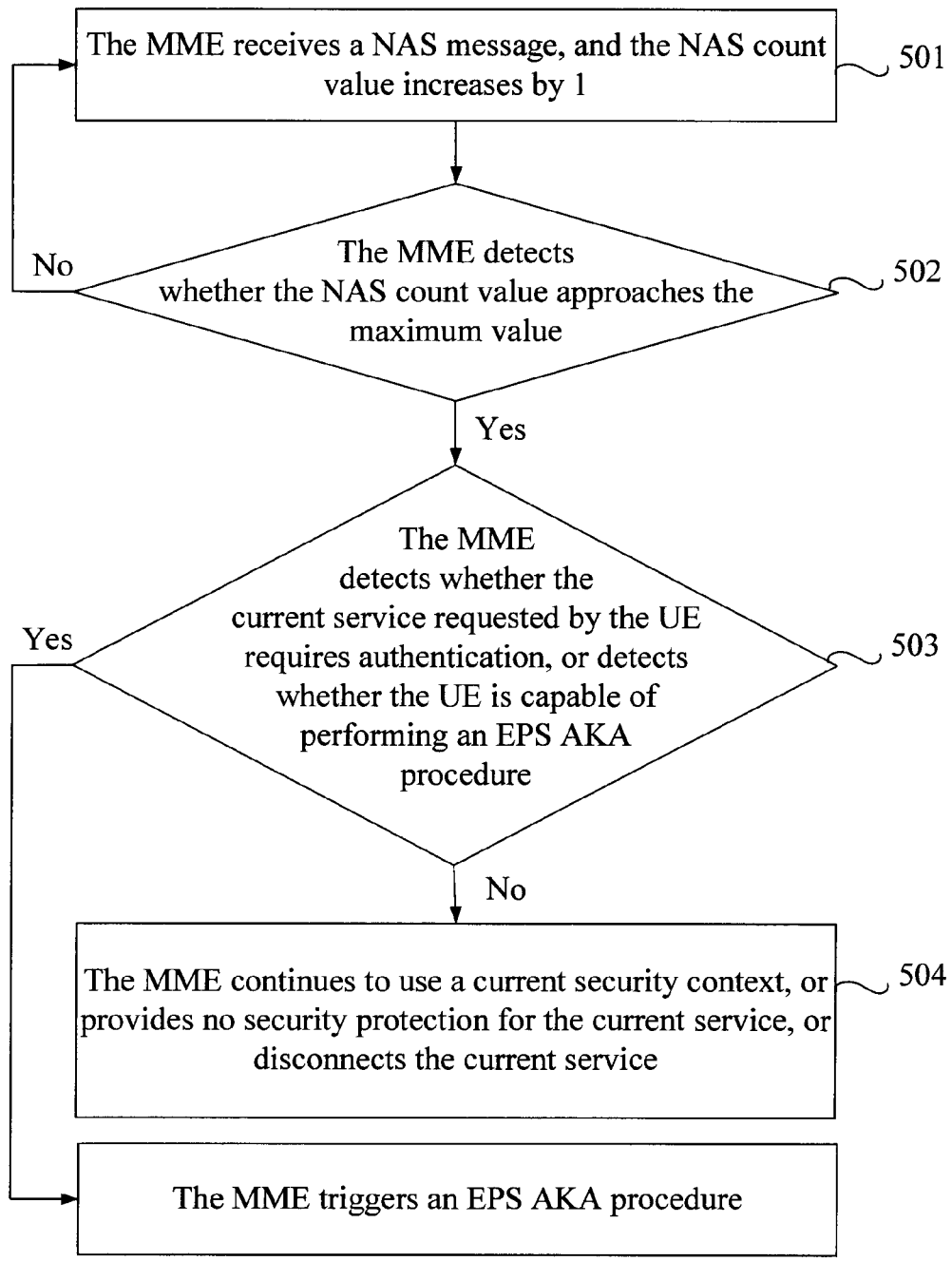
FIG. 5 is a flowchart of an authentication method in a fifth embodiment of the present invention.

FIG. 5 is a flowchart of an authentication method in the fifth embodiment of the present invention. In this embodiment, the native information is the current service type, Quality of Service (QoS), or UE capability of performing authentication.

As shown in FIG. 5, the method in this embodiment includes the following steps:

Step 501: The MME receives a NAS message, and the NAS count value increases by 1.

Step 502: The MME checks whether the NAS count value closes to the maximum value. If so, step 503 occurs; if not, step 501 occurs.

Specifically, a value close to the maximum value may be preset as a threshold value. The MME checks whether the NAS count value is equal to the maximum value. If so, step 503 occurs; if not, step 501 occurs.

Step 503: The MME detects the current service type to know whether the current service, which requested by the UE and corresponding to the current service type, requires authentication; or, the MME detects the QoS to know whether the current service, which requested by the UE and corresponding to the QoS, requires authentication; or, the MME detects the UE capability of performing authentication to know whether the UE is capable of executing the EPS AKA authentication procedure.

If so, the MME triggers an EPS AKA authentication procedure; if not, step 504 occurs.

Step 504: The MME continues to use the current security context, or provides no security protection for the current service, or disconnects the current service.

For example, in this embodiment, the MME detects the current service type to know that the service requested by the UE is an Emergency Call (EMC) service, and the EMC service requested by the UE does not require authentication, and the MME triggers no more EPS AKA authentication procedure. The MME ignores the detection result that the NAS count value closes to the maximum value, and goes on using the current security context, or provides no security protection for the current service, or disconnects the current service.

When a UE with a Subscriber Identity Module (SIM) hands over from an EMC service in a UMTS network to an LTE network, the MME obtains the security parameter "Kc" from a Serving GPRS Support Node (SGSN) (GPRS is an acronym of General Packet Radio Service), and obtains $K_{ASME}$ according to a CK and an Integrity Key (IK). The NAS count value starts from 0. In this case, the security protection for the UE in the LTE network is provided by the sub-key derived from $K_{ASME}$. When the NAS count value is about to wrap around, the MME may detect that the UE is a SIM user incapable of the EPS AKA authentication procedure according to the Kc. Therefore, the MME triggers no more EPS AKA authentication procedure, and ignores the detection result that the NAS count value closes to the maximum value. The MME goes on using the current security context, or provides no security protection for the current service, or disconnects the current service.

In this embodiment, if the service requested by the UE does not require authentication, or the UE is incapable of performing the AKA authentication procedure, the MME triggers no EPS AKA authentication procedure, thus reducing the EPS AKA authentication procedures implemented, avoiding the resource waste caused by triggering of unnecessary EPS AKA authentication procedures, and saving resources.

Figure 6:
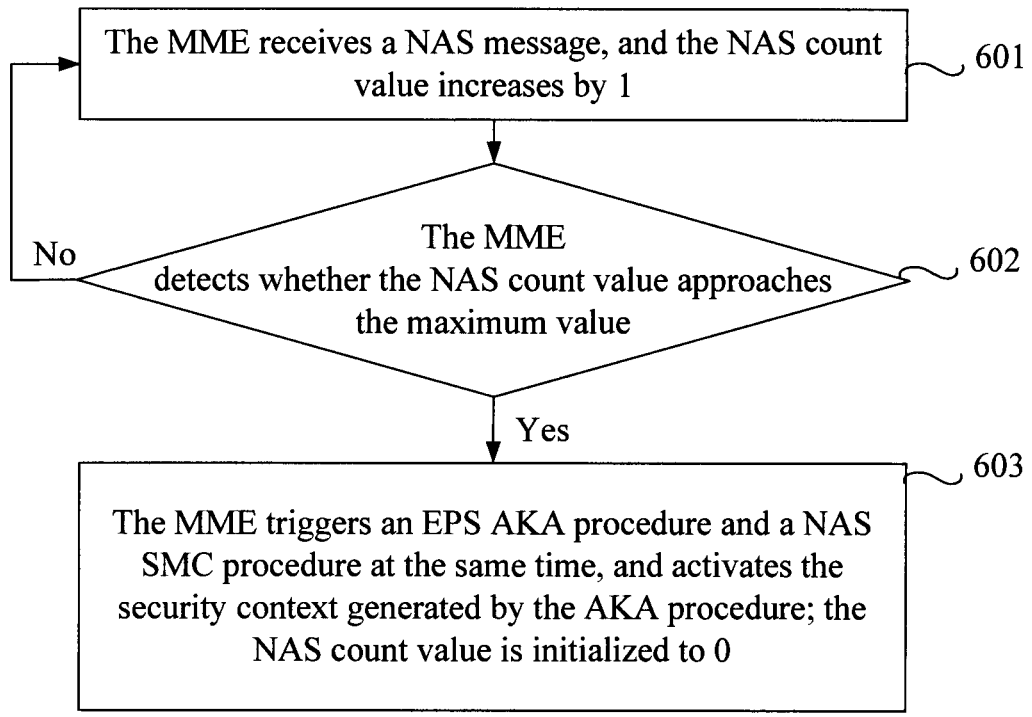
FIG. 6 is a flowchart of an authentication method in a sixth embodiment of the present invention.

FIG. 6 is a flowchart of an authentication method in the sixth embodiment of the present invention. As shown in FIG. 6, the method in this embodiment includes the following steps:

Step 601: The MME receives a NAS message, and the NAS count value increases by 1.

Step 602: The MME checks whether the NAS count value closes to the maximum value. If so, step 603 occurs; if not, step 601 occurs. This NAS count value may be an uplink NAS count value, or a downlink NAS count value.

Specifically, a value close to the maximum value may be preset as a threshold value. The MME checks whether the NAS count value is equal to the threshold value. If so, step 603 occurs; if not, step 601 occurs.

Step 603: The MME triggers an EPS AKA authentication procedure and a NAS SMC procedure at the same time, and activates the security context generated by the AKA authentication procedure. The NAS count value is initialized to 0.

In this embodiment, the EPS AKA authentication procedure is bound to the NAS SMC procedure, thus avoiding repeated triggering of the EPS AKA authentication procedure in the case of detecting that the NAS count value in different directions (uplink direction and downlink direction) is about to wrap around, reducing the EPS AKA authentication procedures, avoiding the resource waste caused by triggering of unnecessary EPS AKA authentication procedures, and saving resources.

Figure 7:
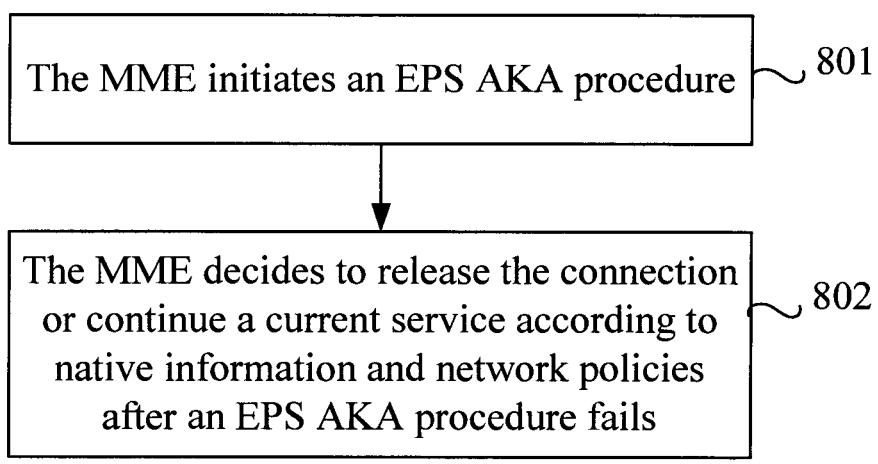
FIG. 7 is a flowchart of an authentication method in a seventh embodiment of the present invention.

FIG. 7 is a flowchart of an authentication method in the seventh embodiment of the present invention. As shown in FIG. 7, the method in this embodiment includes the following steps:

Step 801: The MME initiates an EPS AKA authentication procedure.

Step 802: The MME determines to release or keep a connection of the current service according to native information if an Authentication and Key Agreement (AKA) authentication procedure for the current service fails.

Further, the MME in step 801 may initiate the EPS AKA authentication procedure under several conditions. For example, when the NAS count value reaches a count threshold (closes to the maximum value), the MME initiates the EPS AKA authentication procedure; or an operator's policy triggers the EPS AKA authentication procedure. Specifically, the operator may set certain policy, and the MME triggers the EPS AKA authentication procedure of the UE in the scope of the MME. The policy may be configured by the operator based on certain security policy or other requirements. Alternatively, the network triggers the EPS AKA authentication procedure when the UE hands over between networks. Specifically, when the UE hands over (including active mode mobility and idle mode mobility) from a network of a lower security level (such as the GSM or UMTS network) to a network of a higher security level (such as an LTE network), the network triggers the EPS AKA authentication procedure.

Native information may include at least one of: current service type, QoS, UE capability of performing authentication, network policy, SIM/Universal Subscriber Identity Module (USIM) type, or information about whether a SIM/USIM is inserted in the UE, or any combination thereof. The current service type indicates the type of the current service. The MME can determine whether the current service needs authentication according to the current service type. QoS identifies the service requiring no authentication, and the MME can also determine whether the current service needs authentication according to the QoS. The UE capability of performing authentication serves as a basis for the MME to determine whether the UE is capable of performing the EPS AKA authentication procedure. The SIM type also indicates whether the UE is capable of performing the EPS AKA authentication procedure, and the MME knows whether the UE is capable of performing the EPS AKA authentication procedure according to the SIM type. Because authentication is practicable only if a SIM/USIM is inserted in the UE, if the EPS AKA authentication procedure fails after a SIM/USIM is inserted in the UE, the NAS signaling connection should be released; if no SIM/USIM is inserted in the UE, the MME decides whether to release the connection according to the network policy. The network policy is set by a network device to decide whether to authenticate the current service.

According to the foregoing native information and network policy, step 802 may include:

If the MME the current service is not allowed as an unauthenticated service according to the network policy, the MME releases the connection of the current service.

The MME keeping a connection of the current service if determining that the current service is allowed as an unauthenticated service according to the network policy and determining that any of the following conditions is fulfilled: the current service does not require authentication according to the current service type or the QoS in the native information; or the UE is incapable of performing the AKA authentication procedure according to the UE capability information or SIM/USIM type in the native information; or no SIM/USIM is inserted in the UE.

The MME releases connection of the current service if determining that the network policy allows the current service as an unauthenticated service and determining that any of the following conditions is fulfilled: the current service requires authentication according to the current service type or the QoS in the native information; or the UE is capable of performing the AKA authentication procedure according to the UE capability information or SIM/USIM type in the native information; or a SIM/USIM is inserted in the UE.

For example, if the MME determines that the network policy allows non-authentication of the current service, the MME detects the current service type to know that the service requested by the UE is an EMC service or a public alarm service. If the EMC service or the public alarm service does not require authentication, and the network policy allows the unauthenticated EMC or public alarm service, the MME and the UE continue the current service.

If the current service is a single service carried in the NAS signaling connection, the MME may release the connection of the current service by releasing the NAS signaling connection. If the NAS signaling connection bears multiple services, and the current service type indicates that all the multiple current services need authentication, the MME releases the connection of the NAS signaling. If some of the current services need authentication and other current services may need no authentication (such as EMC), the MME releases the EPS bearer corresponding to the service requiring authentication, and retains the EPS bearer (such as the EMC bearer) corresponding to the service requiring no authentication. The foregoing EPS bearer is based on the NAS signaling connection.

In this embodiment, the current service can still go on in the case that: the authentication fails; the service requested by the UE does not require authentication or the UE is incapable of performing the EPS AKA authentication procedure or no SIM/USIM is inserted in the UE; and the network policy support non-authentication of the current service. Therefore, interruption of the current service is avoided, and system resources are saved.

Figure 8:
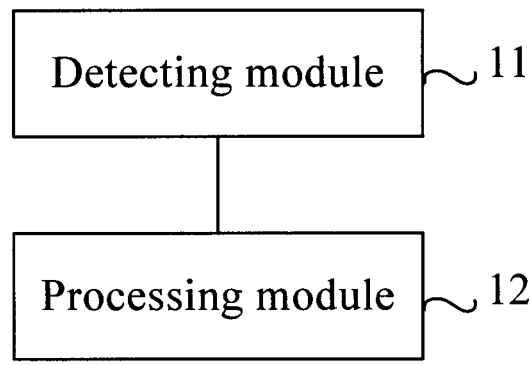
FIG. 8 shows a structure of an authentication apparatus in an eighth embodiment of the present invention.

FIG. 8 shows a structure of an authentication apparatus in the eighth embodiment of the present invention. As shown in FIG. 8, the authentication apparatus in this embodiment includes a detecting module 11 and a processor 12. The detecting module 11 is configured to detect native information when a NAS count value closes to a maximum value; and the processor 12 is configured to decide whether to trigger a procedure for performing AKA with the UE according to a detection result.

The authentication apparatus in this embodiment may work according to the method provided in the first embodiment above.

Figure 9:
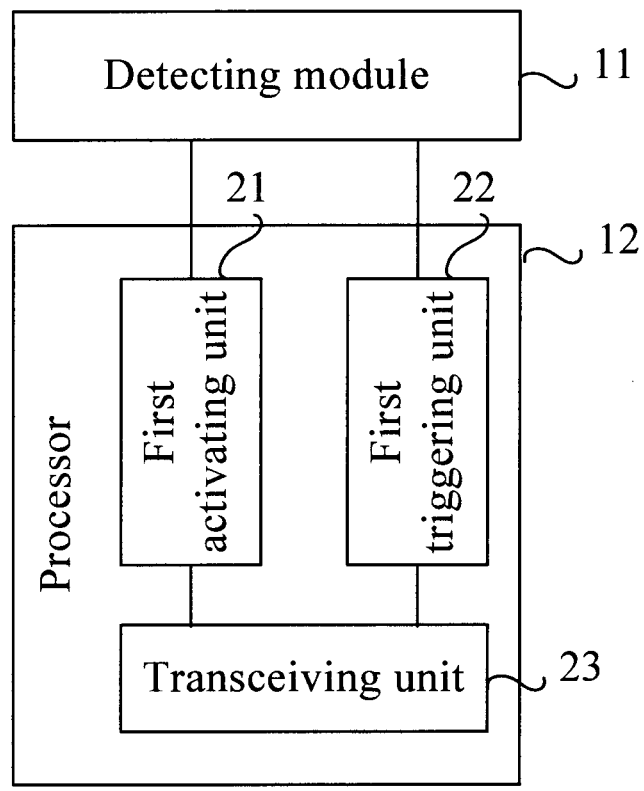
FIG. 9 shows a structure of an authentication apparatus in a ninth embodiment of the present invention.

FIG. 9 shows a structure of an authentication apparatus in the ninth embodiment of the present invention. As shown in FIG. 9, this embodiment is based on the eighth embodiment above, the native information is security context, and the processor 12 includes a first activating unit 21 and a first triggering unit 22. The first activating unit 21 is configured to activate the non-current security context if the detecting module 11 determines that the security contexts include the non-current security context. The first triggering unit 22 is configured to trigger an AKA authentication procedure if the detecting module 11 determines that the security contexts include no non-current security context.

The processor 12 in this embodiment may further include: a transceiving unit 23, configured to send a NAS SMC to the UE, receive a NAS Security Mode Complete message, and send information to the first activating unit 21 in the processor 12, where the information triggers the first activating unit 21 to take action. The first activating unit 21 activates the non-current security context according to the trigger information. The first triggering unit 22 triggers an AKA authentication procedure if the transceiving unit 23 receives no NAS Security Mode Complete message from the UE.

The authentication apparatus in this embodiment may work according to the method provided in the second embodiment above.

Figure 10:
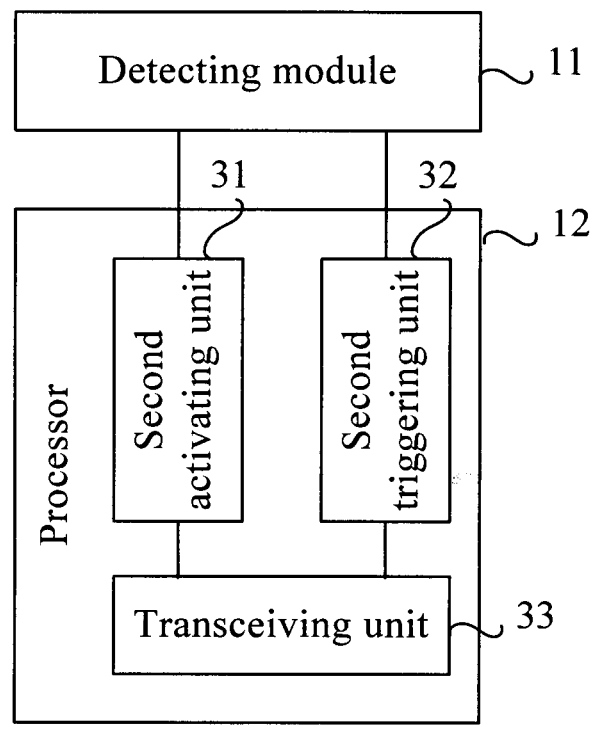
FIG. 10 shows a structure of an authentication apparatus in a tenth embodiment of the present invention.

FIG. 10 shows a structure of an authentication apparatus in the tenth embodiment of the present invention. As shown in FIG. 10, this embodiment is based on the eighth embodiment above, the native information is timer status, and the processor 12 includes a second activating unit 31 and a second triggering unit 32. The second activating unit 31 is configured to activate the non-current security context if the detecting module 11 detects that the timer status is "running". The second triggering unit 32 is configured to trigger the AKA authentication procedure if the detecting module 11 detects that the timer status is "stop".

The processor 12 in this embodiment may further include: a transceiving unit 33, configured to send a NAS SMC to the UE, receive a NAS Security Mode Complete message, and send information to the second activating unit 31 in the processor 12, where the information triggers the second activating unit 31 to take action. The second activating unit 31 activates the non-current security context according to the trigger information. The second triggering unit 32 triggers an AKA authentication procedure if the transceiving unit 33 receives no NAS Security Mode Complete message from the UE.

The authentication apparatus in this embodiment may work according to the method provided in the third embodiment above.

Figure 11:
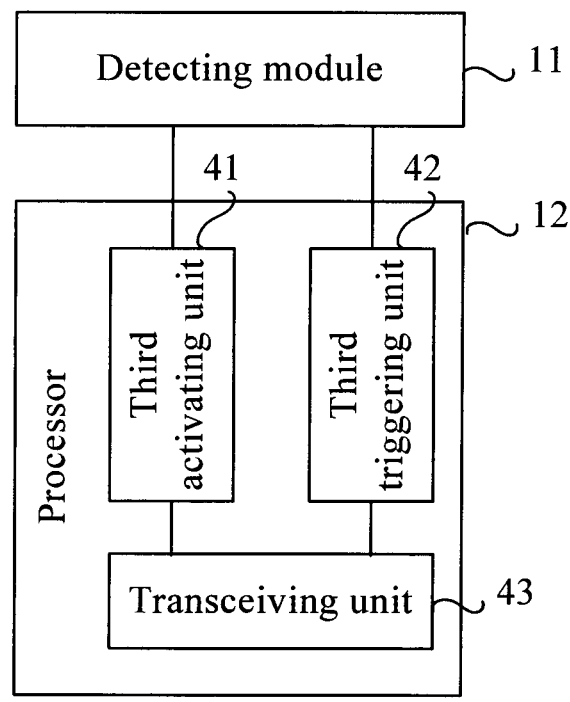
FIG. 11 shows a structure of an authentication apparatus in an eleventh embodiment of the present invention.

FIG. 11 shows a structure of an authentication apparatus in the eleventh embodiment of the present invention. As shown in FIG. 11, this embodiment is based on the eighth embodiment above, the native information is the status of a state machine, the processor 12 includes a third activating unit 41 and a third triggering unit 42. The third activating unit 41 is configured to activate the non-current security context if the detecting module 11 detects that the status of the state machine is "running". The third triggering unit 42 is configured to trigger an AKA authentication procedure if the detecting module 11 detects that the status of the state machine is "idle".

The processor 12 in this embodiment may further include: a transceiving unit 43, configured to send a NAS SMC to the UE, receive a NAS Security Mode Complete message, and send information to the third activating unit 41 in the processor 12, where the information triggers the third activating unit 41 to take action. The third activating unit 41 activates the non-current security context according to the trigger information. The third triggering unit 42 triggers an AKA authentication procedure if the transceiving unit 43 receives no NAS Security Mode Complete message from the UE.

The authentication apparatus in this embodiment may work according to the method provided in the fourth embodiment above.

Figure 12:
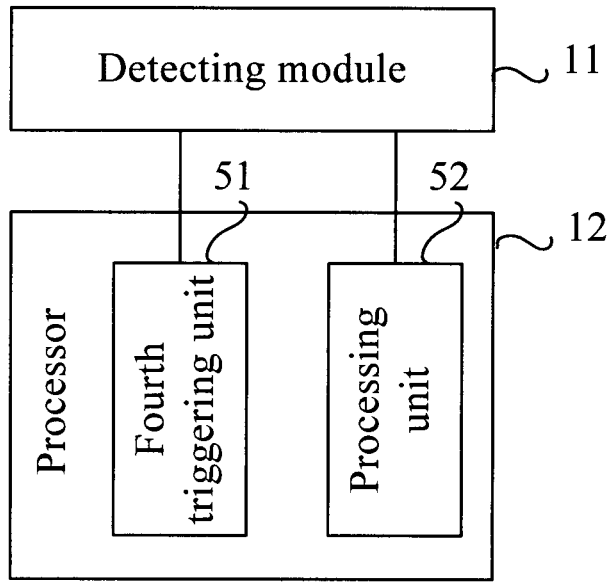
FIG. 12 shows a structure of an authentication apparatus in a twelfth embodiment of the present invention.

FIG. 12 shows a structure of an authentication apparatus in the twelfth embodiment of the present invention. As shown in FIG. 12, this embodiment is based on the eighth embodiment above, the native information is the current service type, or QoS, or UE capability of performing authentication. The processor 12 includes a fourth triggering unit 51 and a processing unit 52. The fourth triggering unit 51 is configured to trigger an AKA authentication procedure if the detecting module 11 determines that the service corresponding to the current service type needs authentication, or the service corresponding to the QoS needs authentication, or the UE is capable of performing an AKA authentication procedure. The processing unit 52 is configured to: continue to use the current security context, or provide no security protection for the current service, or disconnect the current service if the detecting module 11 determines that the service corresponding to the current service type needs no authentication, or the service corresponding to the QoS needs no authentication, or the UE is incapable of performing an AKA authentication procedure.

The authentication apparatus in this embodiment may work according to the method provided in the fifth embodiment above.

In the apparatus provided in this embodiment, the MME does not trigger the EPS AKA authentication procedure as soon as detecting that the NAS count value is about to wrap around, thus reducing the times for triggering the EPS AKA authentication procedures, avoiding the resource waste caused by unnecessary EPS AKA authentication procedures, and saving resources.

Figure 13:
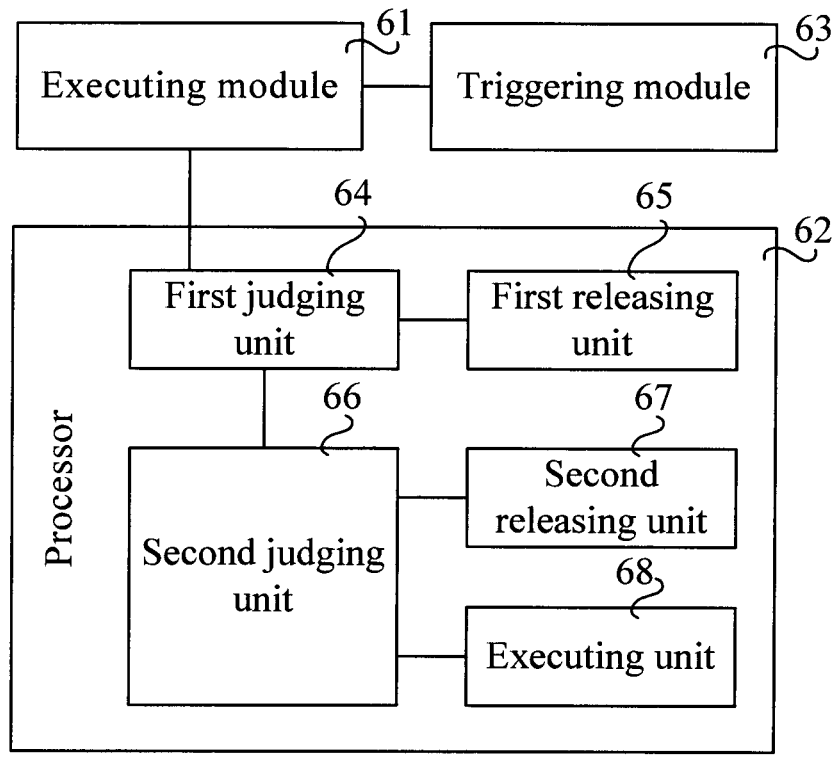
FIG. 13 shows a structure of an authentication apparatus in a thirteenth embodiment of the present invention.

FIG. 13 shows a structure of an authentication apparatus in the thirteenth embodiment of the present invention. As shown in FIG. 13, the apparatus in this embodiment includes: an executing module 61, configured to execute an AKA authentication procedure; and a processor 62, configured to decide to release a connection or continue a current service according to native information and network policy after the executing module 61 fails to execute the AKA authentication procedure.

The apparatus in this embodiment may further include: a triggering module 63, configured to trigger the executing module 61 to execute an AKA authentication procedure according to the trigger conditions such as the NAS count value closing to the maximum value, operator policy, or UE handover between networks.

The processor 62 may further include: a first judging unit 64, configured to judge whether the network policy support non-authentication of the current service if the executing module 61 fails to execute the AKA authentication procedure; a first releasing unit 65, configured to release the connection of the current service if the first judging unit 64 makes a negative judgment; a second judging unit 66, configured to: if the first judging unit 64 makes a positive judgment, judge whether the current service needs authentication according to the current service type or the QoS in the native information, or judge whether the UE is capable of performing the AKA authentication procedure according to the UE capability information or the SIM/USIM type in the native information, or judge whether a SIM/USIM is inserted in the UE; a second releasing unit 67, configured to release the connection of the current service if the second judging unit 66 makes a positive judgment; and an executing unit 68, configured to continue executing the current service if the second judging unit 66 makes a negative judgment.

The authentication apparatus in this embodiment may work according to the method provided in the seventh embodiment above.

In this embodiment, the current service can still go on in the case that: the authentication fails; the service requested by the UE does not require authentication or the UE is incapable of performing the EPS AKA authentication procedure or no SIM/USIM is inserted in the UE; and the network policy support non-authentication of the current service. Therefore, interruption of the current service is avoided, and system resources are saved.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. An authentication method, comprising:
   triggering, by a Mobility Management Entity (MME), an Authentication and Key Agreement (AKA) procedure for a current service if a Non Access Stratum (NAS) count value approaches a maximum value;
   determining, by the MME, whether the current service is allowed as an unauthenticated service according to a network policy if the AKA procedure for the current service fails; and
   keeping, by the MME, an NAS signaling connection of the current service when the current service does not require authentication, the NAS count value closes to the maximum value and the current service is determined to be allowed as an unauthenticated service according to the network policy.

2. The method according to claim 1, further comprising releasing the NAS signaling connection of the current service, after it is determined that the current service is not allowed as an unauthenticated service according to the network policy.

3. The method according to claim 2, wherein releasing the NAS signaling connection of the current service comprises:
   if the NAS signaling connection bears a single service, releasing the NAS signaling connection, and
   if the NAS signaling connection bears multiple services and all the multiple services need authentication, releasing the NAS signaling connection.

4. The method according to claim 2, wherein releasing the NAS signaling connection of the current service comprises:
   if the NAS signaling connection bears multiple services and some of the multiple services need authentication while others need no authentication, releasing an Evolved Packet System (EPS) bearer corresponding to the service requiring authentication, and keeping the EPS bearer corresponding to the service requiring no authentication.

5. The method according to claim 1, further comprising:
   releasing the NAS signaling connection of the current service, after it is determined that the current service is allowed as an unauthenticated service according to the network policy and the current service requires authentication.

6. The method according to claim 1, further comprising:
   determining, by the MME, whether the current service requires authentication according to a current service type or Quality of Service (QoS).

7. The method according to claim 1, wherein:
   the current service comprises an Emergency Call (EMC) service or a public alarm service.

8. The method according to claim 7, wherein:
   the EMC service or public alarm service does not require authentication.

9. An apparatus, comprising:
   a first processor, configured to trigger an Authentication and Key Agreement (AKA) procedure for a current service if a Non Access Stratum (NAS) count value closes to a maximum value; and
   a second processor, configured to:
      determine whether the current service is allowed as an unauthenticated service according to a network policy if the AKA procedure for the current service fails;
      determine whether the current service requires authentication if the second processor determines the current service is allowed as an unauthenticated service according to the network policy; and
      keep an NAS signaling connection of the current service when the current service does not require authentication, the NAS count value closes to the maximum value and the current service is determined to be allowed as an unauthenticated service according to the network policy.

10. The apparatus according to claim 9, wherein the second processor is configured to release the NAS signaling connection of the current service if the second processor determines the current service is not allowed as an unauthenticated service according to the network policy.

11. The apparatus according to claim 10, wherein the second processor is configured to:
   release the NAS signaling connection if the NAS signaling connection bears single service; and
   release the NAS signaling connection if the NAS signaling connection bears multiple services, and all the multiple services need authentication.

12. The apparatus according to claim 10, wherein the second processor is configured to:
   release an Evolved Packet System (EPS) bearer corresponding to the service requiring authentication, and keep the EPS bearer corresponding to the service requiring no authentication, if the NAS signaling connection bears multiple services, and some of the multiple services need authentication and the others need no authentication.

13. The apparatus according to claim 9, wherein the second processor is configured to release the NAS signaling connection of the current service if the second processor determines the current service requires authentication.

14. The apparatus according to claim 9, wherein the second processor is configured to determine whether the current service requires authentication according to a current service type or QoS if the second processor determines the current service is allowed as an unauthenticated service according to the network policy.

15. The apparatus according to claim 9, wherein the second processor is configured to determine whether the current service requires authentication, if the second processor determines the current service is allowed as an unauthenticated service according to the network policy.

16. The apparatus according to claim 9, wherein:
the current service comprises an Emergency Call (EMC) service or a public alarm service.

17. The apparatus according to claim 9, wherein the first processor and the second processor are implemented as a single processor or the first processor and the second processor are two separate processors.

18. An apparatus, comprising:
a memory;
one or more processors; and
one or more programs stored in the memory and configured for execution by the one or more processors, the one or more programs including instructions for:
triggering an Authentication and Key Agreement (AKA) procedure if a Non Access Stratum (NAS) count values closes to a maximum value;
determining whether a current service is allowed as an unauthenticated service according to a network policy if the AKA authentication procedure for the current service fails; and
keeping an NAS signaling connection of the current service after it is determined that the current service is allowed as an unauthenticated service according to the network policy, the current service does not require authentication, and the NAS count values closes to the maximum value.

19. The apparatus according to claim 18, wherein the one or more programs further include instructions for releasing the NAS signaling connection of the current service, if the current service is not allowed as an unauthenticated service according to the network policy.

20. The apparatus according to claim 18, wherein the one or more programs further include instructions for releasing the NAS signaling connection of the current service, if the current service is allowed as an unauthenticated service according to the network policy and the current service requires authentication.

* * * * *